(12) United States Patent
Fujita et al.

(10) Patent No.: US 6,388,006 B1
(45) Date of Patent: May 14, 2002

(54) SELF-ADHESIVE COMPOSITION

(75) Inventors: Masayuki Fujita; Yoshiki Nakagawa, both of Kobe; Masato Kusakabe, Takasago, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/485,119

(22) PCT Filed: Aug. 6, 1998

(86) PCT No.: PCT/JP98/03501

§ 371 Date: May 22, 2000

§ 102(e) Date: May 22, 2000

(87) PCT Pub. No.: WO99/07803

PCT Pub. Date: Feb. 18, 1999

(30) Foreign Application Priority Data

Aug. 6, 1997 (JP) .............................................. 9-211674

(51) Int. Cl.⁷ .............................. C09J 1/00; C08F 2/00; C08F 8/100; C08F 10/00; C08L 1/00
(52) U.S. Cl. ........................ 524/862; 524/849; 524/853; 156/327; 156/329
(58) Field of Search .................................. 524/862, 849, 524/853; 156/327, 329

(56) References Cited

U.S. PATENT DOCUMENTS

| 5,194,501 | A | * | 3/1993 | Babu et al. .................. 525/103 |
| 5,733,978 | A | * | 3/1998 | Kobayashi ................... 525/100 |
| 5,763,548 | A | | 6/1998 | Matyjaszewski et al. ... 526/135 |
| 5,789,485 | A | * | 8/1998 | Kobayashi et al. ......... 525/100 |
| 5,789,487 | A | | 8/1998 | Matyjaszewski et al. ... 525/301 |
| 5,807,937 | A | | 9/1998 | Matyjaszewski et al. ... 526/135 |

FOREIGN PATENT DOCUMENTS

| WO | WO 96/30421 | 10/1996 |
| WO | WO 97/18247 | 5/1997 |

* cited by examiner

*Primary Examiner*—Nathan M. Nutter
(74) *Attorney, Agent, or Firm*—Connolly Bove Lodge & Hutz LLP

(57) ABSTRACT

A pressure sensitive adhesive composition which comprises the following two components:
(A) a vinyl polymer having at least one alkenyl group represented by the general formula (1):

$$CH_2=C(R^1)— \qquad (1)$$

wherein $R^1$ represents a hydrogen atom or a methyl group;
(B) a hydrosilyl group-containing compound is provided. The composition can give cured products having a high gel fraction and can be cured rapidly since the degree of alkenyl group introduction is high.

14 Claims, No Drawings

SELF-ADHESIVE COMPOSITION

TECHNICAL FIELD

The present invention relates to a pressure sensitive adhesive composition. More particularly, it relates to a pressure sensitive adhesive composition which comprises an alkenyl group-containing vinyl polymer and a hydrosilyl group-containing compound and can be cured rapidly and can have a high solid content because the polymer has low viscosity.

BACKGROUND ART

Acrylic pressure sensitive adhesives show well-balanced adhesion characteristics without the addition of a tackifier resin and, therefore, are produced in large amounts side-by-side natural rubber-based pressure sensitive adhesives. Acrylic pressure sensitive adhesives have insufficient cohesive force because of their molecular weight and molecular weight distribution and, therefore, they are generally crosslinked for improving their cohesion. For the crosslinking, various techniques have already been developed. Thus, for example, techniques have been proposed which comprise adding a crosslinking agent, such as a polyisocyanate compound, epoxy compound, polycarboxylic acid, polyamine compound, phenolic resin or sulfur compound, or crosslinking an alkenyl-containing acrylic polymer in the presence of a condensation catalyst. In particular, pressure sensitive adhesives comprising an alkenyl-containing acrylic polymer as the main component, which are cured by crosslinking via siloxane bonding, has good weathering resistance.

For curing by siloxane crosslinking, however, moisture absorption is essential. In winter, in particular, when the humidity is low, undercure is a great problem. For solving such undercure problem without sacrificing the high weathering resistance resulting from siloxane crosslinking systems, an acrylic pressure sensitive adhesive utilizing the hydrosilylation reaction as the curing reaction has been proposed, as specifically disclosed, for example, in Japanese Kokai Publication Hei-03-95266, Japanese Kokai Publication Hei-04-93376 and Japanese Kokai Publication Hei-04-145188. In curing systems in which the hydrosilylation reaction is used as the curing reaction, moisture absorption is not required but uniform cured products can be obtained by mere heating. In addition, the rate of curing is very rapid, so that such systems are suited for use in adhesive production lines.

In the pressure sensitive adhesive utilizing a hydrosilylation reaction, an alkenyl group-containing acrylic polymer is used as the main component and a hydrosilyl group-containing compound as the curing agent. The alkenyl-containing acrylic polymer can be prepared not only by copolymerization of an acrylic monomer(s) and an alkenyl-containing vinyl monomer but also by copolymerizing a vinyl monomer having a functional group such as a hydroxy or carboxyl group and then reacting the polymer with an alkenyl-containing compound having a further group capable of reacting with the functional group.

For a cured product to have elastic properties required of an pressure sensitive adhesive, it is necessary that the polymer have a high molecular weight and that the molecular weight of the portion between crosslinking sites of the polymer be increased by decreasing the amount of the comonomer having a an alkenyl group or a functional group derivable into an alkenyl group. However, when the molecular weight of the polymer is increased, the molecular weight distribution becomes broadened and the viscosity becomes high or a solid polymer is obtained, since the vinyl polymer is synthesized by free radical polymerization. For using such a polymer in a pressure sensitive adhesive, a problem is encountered, namely it is necessary that the viscosity be reduced by using a fairly large amount of a solvent. In addition, free radical polymerization results in almost random introduction of the comonomer containing an alkenyl group or a functional group derivable into an alkenyl group into the polymer. Therefore, to reduce the amount of the comonomer containing an alkenyl group or a functional group derivable into an alkenyl group means that the percentage of formation of polymers not containing alkenyl group increases. These polymers are not integrated into the crosslinked structure, so that the range which can control physical properties of cured products is remarkably narrowed. Furthermore, for obtaining a vinyl polymer showing a low viscosity and having a high percentage of alkenyl groups, it is necessary to use a monomer containing an alkenyl group or a functional group derivable into an alkenyl group in a considerably high proportion. This, however, results in shortened distances between crosslinking sites in cured products, and hence in failure to produce elastic properties required of pressure sensitive adhesives. Thus, the problem is that a system satisfactorily meeting the requirements concerning low viscosity of polymers, a high percentage of alkenyl groups in the polymers and elastic properties of cured products cannot be established.

In the case of solvent type pressure sensitive adhesives, a great amount of heat energy is consumed to evaporate the solvent after application to a substrate such as a film, or a fire may possibly be caused or the human body may be adversely affected. Solvent-free or high solid content pressure sensitive adhesives are thus demanded.

For solving the above problems and obtaining a high-performance pressure sensitive adhesive, a method is conceivable which uses, as the base polymer of the pressure sensitive adhesive, an acyclic copolymer having a relatively low molecular weight and a sufficiently low viscosity and having an alkenyl group capable of undergoing crosslinking or chain extension as introduced terminally to the polymer. In the prior art, however, it is difficult to produce alkenyl-terminated (meth)acrylic polymers.

Japanese Kokai Publication Hei-05-255415 discloses a method of producing latexes which comprises subjecting a vinyl monomer and a diene monomer to emulsion polymerization using a dialkenyl disulfide as a chain transfer agent. Japanese Kokai Publication Hei-01-247403 discloses a method of producing alkenyl-terminated acrylic polymers which comprises using an allyl-containing disulfide or thiuram disulfide as an initiator. By these methods, however, it is not easy to introduce the alkenyl group into a terminus with certainty. In Japanese Kokai Publication Hei-06-211922, the production of alkenyl-terminated vinyl polymers is described by obtaining a vinyl polymer having a hydroxy group at both termini by using a hydroxy-containing polysulfide chain transfer agent in large excess relative to the initiator, followed by hydroxy group conversion. This method has a problem from the production process viewpoint since the chain transfer agent, which is expensive, is used in large amounts, although terminal alkenyl group introduction can be effected with a relatively high rate.

Accordingly, the task imposed on the present invention is to provide a pressure sensitive adhesive composition in which a vinyl polymer having a narrow molecular weight distribution and a low viscosity and a high alkenyl group content is used as the main component and which can have a high solid content and is rapidly curable and by which the above problems can be solved.

SUMMARY OF THE INVENTION

The present invention provides a novel pressure sensitive adhesive composition comprising the constituents mentioned below, by which the above problems are solved. Thus provided is:

1) a pressure sensitive adhesive composition which comprises the following two components:
(A) a vinyl polymer having at least one alkenyl group represented by the general formula (1):

$$CH_2=C(R^1)— \qquad (1)$$

wherein $R^1$ represents a hydrogen atom or a methyl group, and
(B) a hydrosilyl-containing compound; more specifically,
2) the pressure sensitive adhesive composition according to 1),
wherein the (A) component (meth) acrylic polymer has a weight average molecular weight-to-number average molecular weight ratio of less than 1.8 as determined by gel permeation chromatography; or
3) the pressure sensitive adhesive composition according to 1) or 2),
wherein the component (A) vinyl polymer is obtainable by the steps of:
(1) polymerizing a vinyl monomer in the manner of atom transfer radical polymerization to thereby produce a vinyl polymer having a terminal structure represented by the general formula (2):

$$—C(R^2)(R^3)(X) \qquad (2)$$

wherein $R^2$ and $R^3$ each represents a group bound to an ethylenically unsaturated group of the vinyl monomer and X represents chlorine, bromine or iodine, and
(2) converting the terminal halogen of the polymer to a substituent containing the alkenyl group of the general formula (1); or
4) the pressure sensitive adhesive composition according to 1) or 2),
wherein the component (A) vinyl polymer is obtainable by the steps of:
(1) polymerizing a vinyl monomer in the manner of living radical polymerization for producing a vinyl polymer and
(2) successively reacting the polymer with a compound having at least two alkenyl groups having low polymerizability.

DETAILED DESCRIPTION OF THE INVENTION

The pressure sensitive adhesive of the present invention comprises the following two components:
(A) a vinyl polymer having at least one alkenyl group represented by the general formula (1):

$$CH_2=C(R^1)— \qquad (1)$$

wherein $R^1$ represents a hydrogen atom or a methyl group, and
(B) a hydrosilyl-containing compound. Hereinafter, the pressure sensitive adhesive composition of the present invention is described in detail.

Component (A) Vinyl Polymer

The alkenyl group of the general formula (1), which is the crosslinking group of the component (A) vinyl polymer includes, among others, hydrocarbon groups represented by the general formula (3):

$$CH_2=C(R^1)—R^4— \qquad (3)$$

wherein $R^1$ is as defined above and $R^4$ represents a direct bond or a divalent hydrocarbon group containing 1 to 20 carbon atoms.

Specific examples of the divalent hydrocarbon group containing 1 to 20 carbon atoms are $—(CH_2)_n—$ (n being an integer of 0 to 10), $—CH_2CH(CH_3)—$, $—CH_2CH(CH_3)CH_2—$ and the like.

As the alkenyl group of the general formula (1), there may also be mentioned alkenyl groups bound to the main chain via an oxygen atom, for example ether bond-containing alkenyl groups represented by the general formula (4) shown below, ester bond-containing alkenyl group represented by the general formula (5) or (6) shown below and carbonate bond-containing alkenyl groups represented by the general formula (7) shown below.

$$CH_2=C(R^1)—R^5—O— \qquad (4)$$

$$CH_2=C(R^1)—R^5—OC(O)— \qquad (5)$$

$$CH_2=C(R^1)—R^5—C(O)O— \qquad (6)$$

$$CH_2=C(R^1)—R^5—OC(O)O— \qquad (7)$$

In the above formulas, $R^1$ is as defined above and $R^5$ represents a direct bond or a divalent organic group containing 1 to 20 carbon atoms, which may optionally contain one or more ether bonds.

Referring to $R^5$ in the above general formulas (4), (5) (6) and (7), the divalent $C_1$ to $C_{20}$ organic group which may optionally contain one or more ether bonds and specifically includes, among others,
$—(CH_2)_n—$ (n being an integer of 0 to 20), $—CH_2CH(CH_3)—$,
$—CH_2CH(CH_3)CH_2—$; $—CH_2OCH_2CH_2—$, $—CH_2OCH_2CH_2CH_2—$, $—CH_2CH_2OCH_2CH_2—$,
$—CH_2CH_2OCH_2CH_2CH_2—$; o-, m- or p-$C_6H_4—$, o-, m- or p-$CH_2—C_6H_4—$,
o-, m- or p-$CH_2—C_6H_4—CH_2—$ and the like.

Electron-withdrawing group-containing groups represented by the general formula (8) may also be mentioned as the alkenyl group of the general formula (1):

$$CH_2=C(R^1)—R^5—C(R^6)(R^7)— \qquad (8)$$

In the above formula, $R^1$ and $R^5$ are as defined above, and $R^6$ and $R^7$ each represents an electron-withdrawing group serving to stabilize the carbanion $C^-$ or one of them represents such an electron-withdrawing group and the other represents a hydrogen atom, an alkyl group containing 1 to 10 carbon atoms or a phenyl group. As the electron-withdrawing group represented by $R^6$ or $R^7$, there may be mentioned $—CO_2R$ (ester group), $—C(O)R$ (keto group), $—CON(R_2)$ (amide group), $—COSR$ (thioester group), $—CN$ (nitrile group) and $—NO_2$ (nitro group), among others. The substituent R is an alkyl group containing 1 to 20 carbon atoms, an aryl group containing 6 to 20 carbon atoms or an aralkyl group containing 7 to 20 carbon atoms and preferably is an alkyl group containing 1 to 10 carbon atoms or a phenyl group. As regards $R^6$ or $R^7$, $—CO_2R$, $—C(O)R$ and $—CN$ are particularly preferred.

The monomer forming the main chain of the (A) component vinyl polymer is not particularly restricted but may be any of a number of various monomers. As examples, there may be mentioned (meth)acrylic acid, methyl (meth) acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth) acrylate, toluyl (meth)acrylate, benzyl (meth)acrylate, 2-methoxyethyl (meth)acrylate, 3-methoxybutyl (meth) acrylate, 2-hydroxyethyl (meth)acrylate, 2-hydroxypropyl (meth)acrylate, stearyl (meth)acrylate, glycidyl (meth) acrylate, 2-aminoethyl (meth)acrylate, ■-(methacryloyloxy) propyltrimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth) acrylate, 2-perfluoromethyl-2-perfluoroethylmethyl (meth) acrylate, 2-perfluorohexylethyl (meth)acrylate, 2-perfluorodecylethyl (meth)acrylate, 2-perfluorohexadecylethyl (meth)acrylate and like (meth) acrylic monomers; styrene, vinyltoluene, á-methylstyrene, chlorostyrene, styrenesulfonic acid and salts thereof, and like styrenic monomers; perfluoroethylene, perfluoropropylene, vinylidene fluoride and like fluorine-containing vinyl monomers; vinyltrimethoxysilane, vinyltriethoxysilane and like silicon-containing vinyl monomers; maleic anhydride, maleic acid, maleic acid monoalkyl esters and dialkyl esters; fumaric acid, fumaric acid monoalkyl esters and dialkyl esters; maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and like maleimide monomers; acrylonitrile, methacrylonitrile and like nitrile group-containing vinyl monomers; acrylamide, methacrylamide and like amide group-containing vinyl monomers; vinyl acetate, vinyl propionate, vinyl pivalate, vinyl benzoate, vinyl cinnamate and like vinyl esters; ethylene, propylene and like alkenes; butadiene, isoprene and like conjugated dienes; vinyl chloride, vinylidene chloride, allyl chloride and allyl alcohol, among others. These may be used singly or a plurality of monomers may be copolymerized. In the above contexts, "(meth) acrylic acid", for instance, means acrylic acid and/or methacrylic acid.

Among the vinyl polymers having at least one alkenyl group represented by the general formula (1), those (meth) acrylic polymers which are synthesized by using not less than 40% by weight of a (meth) acrylic monomer(s) among the above monomers are preferred from the viewpoint of physical properties.

The molecular weight distribution, namely the ratio (Mw/Mn) of weight average molecular weight (Mw) to number average molecular weight (Mn), of the vinyl polymer having at least one alkenyl group is not particularly restricted. For maintaining the viscosity of a curable composition prepared using said polymer at a low level and facilitating the handling thereof and obtaining, at the same time, cured products having satisfactory physical properties, however, it is preferred that the molecular weight distribution be as narrow as possible. The molecular weight distribution value is thus preferably less than 1.8, more preferably not more than 1.7, still more preferably nor more than 1.6, still more preferably not more than 1.5, still more preferably not more than 1.4 and most preferably not more than 1.3. The most generally employed method of determining the molecular weight distribution is gel permeation chromatography (GPC). Chloroform or THF can be used as the mobile phase and a polystyrene gel column as the column, and the number average molecular weight and other data can be obtained on the polystyrene equivalent basis.

The molecular weight of the vinyl polymer having at least one alkenyl group is not particularly restricted but is preferably within the range of 500 to 100,000. When the molecular weight is below 500, the characteristics intrinsic in the vinyl polymer are hardly expressed. A molecular weight of not less than 100,000 makes handling difficult.

For obtaining elastic properties required of pressure sensitive adhesives, it is preferred that the component (A), namely the vinyl polymer having at least one alkenyl group is a vinyl polymer having at least one alkenyl group at a molecular chain terminus.

The method of synthesizing the vinyl polymer having at least one alkenyl group is not particularly restricted but various methods of polymerization can be used. Preferred from the viewpoint of versatility concerning monomers and ease of control, however, are the method comprising effecting direct alkenyl group introduction by radical polymerization and the method comprising obtaining a vinyl polymer having a specific functional group convertible to an alkenyl group by one to several reaction steps and then converting the specific functional group to an alkenyl group, to give a vinyl polymer having at least one alkenyl group.

The techniques for radical polymerization to be used in synthesizing the vinyl polymer having a specific functional group, inclusive of an alkenyl group, may be classified into "ordinary radical polymerization", in which a monomer having a specific functional group and a vinyl monomer are merely copolymerized using an azo compound or a peroxide, for instance, as the polymerization initiator, and "controlled radical polymerization" by which it is possible to introduce a specific functional group into the polymer at controlled sites, for example at terminal sites.

"Ordinary radical polymerization" is simple and easy to perform. However, the monomer having a specific functional group can be introduced into the polymer only in a random manner. When a polymer with a high degree of functionalization is to be obtained, it is necessary to use the monomer in a considerably large amount. When the amount of the monomer is small, the problem arises in that the proportion of polymer molecules increases in which the specific functional group has not been introduced. Another problem resulting from a wide molecular weight distribution is that only a polymer having high viscosity can be obtained, since free radical polymerization is involved therein.

"Controlled radical polymerization" methods can be further classified into a "chain transfer agent method", which comprises using a chain transfer agent having a specific functional group to there by obtain a functional group-terminated vinyl polymer, and a "living radical polymerization method", by which a polymer having a molecular weight almost as designed can be obtained as a result of growing polymerization termini without undergoing termination or like reactions.

The "chain transfer agent method" can give a polymer with a high degree of functionalization. However, this method requires a fairly large amount of a chain transfer agent having a specific functional group as compared with the initiator and raises economical problems, inclusive of a treatment-related problem. Like the above "ordinary radical polymerization", this method involves free radical polymerization and, therefore, produces another problem, namely it gives only a high viscosity polymer with a wide molecular weight distribution.

Differing from the above polymerization methods, the "living radical polymerization" proceeds at a high rate of polymerization, hardly undergoes termination reactions, gives a polymer with a narrow molecular weight distribution (polymer with an Mw/Mn value of about 1.1 to 1.5) in spite of its being a mode of that radical polymerization which is regarded as difficult to control because of tendency towards occurrence of termination reactions such as radical-to-radical coupling. It is also possible to arbitrarily control the molecular weight by adjusting the monomer/initiator charge ratio.

The "living radical polymerization" method thus can give a low viscosity polymer with a narrow molecular weight distribution and, in addition, allows introduction of the specific functional group-containing monomer into the polymer mostly at the desired sites and, therefore, is preferred as the method of producing the above specific functional group-containing vinyl polymer.

While the term "living polymerization", in its narrower sense, means polymerization in which molecular chains grow while the termini thereof always retain their activity, this term generally includes, within the meaning thereof, quasi-living polymerization in which terminally inactivated molecules and terminally active molecules grow in a state of equilibrium. The latter definition applies to the living polymerization to be employed in the practice of the present invention.

Such "living radical polymerization" has recently been studied actively by various groups. As examples, there may be mentioned, among others, the use of a cobalt-porphyrin complex as described in J. Am. Chem. Soc., 1994, vol. 116, pages 7943 ff, the use of a radical capping agent such as a nitroxide compound as described in Macromolecules, 1994, vol. 27, pages 7228 ff., and the technique of "atom transfer radical polymerization (ATRP)" which uses an organic halide or the like as the initiator and a transition metal complex as the catalyst.

Among the "living radical polymerization" techniques, the above-mentioned "atom transfer radical polymerization" technique, which comprises polymerizing vinyl monomers by use of an organic halide or halogenated sulfonyl compound as the initiator and a transition metal complex as the catalyst, has, in addition to the above-mentioned features of "living radical polymerization", further features; namely it gives a polymer having a halogen or the like, which is relatively advantageous to functional group conversion, at the main chain termini, and the degree of freedom in initiator and catalyst designing is great. Therefore, this technique is more preferred as the method of producing the above-mentioned specific functional group-containing vinyl polymer. Such "atom transfer radical polymerization" is described, for example, by Matyjaszewski et al. in J. Am. Chem. Soc., 1995, vol. 117, pages 5614 ff.; Macromolecules, 1995, vol. 28, pages 7901 ff.; Science, 1996, vol. 272, pages 866 ff.; WO 96/30421 and WO 97/18247, and by Sawamoto et al. in Macromolecules, 1995, vol. 28, pages 1721 ff.

In this atom transfer radical polymerization, an organic halide, in particular an organic halide having a highly reactive carbon-halogen bond (e.g. a carbonyl compound having a halogen at á-position or a compound having a halogen at benzyl-position), a halogenated sulfonyl compound or the like is used as the initiator.

For obtaining crosslinkable vinyl polymers using the polymerization technique, it is also possible to use an organic halide or halogenated sulfonyl compound having two or more initiation site as the initiator. As specific examples thereof, there may be mentioned, among others:

o-, m-, p-$XCH_2$—$C_6H_4$—$CH_2X$, o-, m-, p-$CH_3C(H)(X)$—$C_6H_4$—$C(H)(X)CH_3$, o-, m-, p-$(CH_3)_2C(X)$—$C_6H_4$—$C(X)(CH_3)_2$ (in which $C_6H_4$ denotes a phenylene group and X represents chlorine, bromine or iodine):

$RO_2C$—$C(H)(X)$—$(CH_2)_n$—$C(H)(X)$—$CO_2R$,
$RO_2C$—$C(CH_3)(X)$—$(CH_2)_n$—$C(CH_3)(X)$—$CO_2R$,
$RC(O)$—$C(H)(X)$—$(CH_2)_n$—$C(H)(X)$—$C(O)R$,
$RC(O)$—$C(CH_3)(X)$—$(CH_2)_n$—$C(CH_3)(X)$—$C(O)R$ (in which R represents an alkyl group having 1 to 20 carbon atoms, an aryl group or an aralkyl group, n represents an integer of 0 to 20 and X represents chlorine, bromine or iodine):

$XCH_2$—$C(O)$—$CH_2X$, $H_3C$—$C(H)(X)$—$C(O)$—$C(H)(X)$—$CH_3$, $(H_3C)_2C(X)$—$C(O)$—$C(X)(CH_3)_2$, $C_6H_5C(H)(X)$—$(CH_2)_n$—$C(H)(X)C_6H_5$ (in which X represents chlorine, bromine or iodine and n represents an integer of 0 to 20);

$XCH_2CO_2$—$(CH_2)_n$—$OCOCH_2X$, $CH_3C(H)(X)CO_2$—$(CH_2)_n$—$OCOC(H)(X)CH_3$, $(CH_3)_2C(X)CO_2$—$(CH_2)_n$—$OCOC(X)(CH_3)_2$ (in which n represents an integer of 1 to 20);

$XCH_2C(O)C(O)CH_2X$, $CH_3C(H)(X)C(O)C(O)C(H)(X)CH_3$, $(CH_3)_2C(X)C(O)C(O)C(X)(CH_3)_2$, o-, m-, p-$XCH_2CO_2$—$C_6H_4$—$OCOCH_2X$,
o-, m-, p-$CH_3C(H)(X)CO_2$—$C_6H_4$—$OCOC(H)(X)CH_3$,
o-, m-, p-$(CH_3)_2C(X)CO_2$—$C_6H_4$—$OCOC(X)(CH_3)_2$,
o-, m-, P-$XSO_2$—$C_6H_4$—$SO_2X$ (in which X represents chlorine, bromine or iodine); and the like.

The transition metal complex to be used as the catalyst in atom transfer radical polymerization is not particularly restricted but preferably is a metal complex with an element of a group 7, 8, 9, 10 or 11 of the periodic table as the central metal. As more preferred examples, there may be mentioned complexes of copper having a valency of 0 (zero), monovalent copper, divalent ruthenium, divalent iron or divalent nickel. Among them, copper complexes are preferred. Specific examples of the monovalent copper compounds are cuprous chloride, cuprous bromide, cuprous iodide, cuprous cyanide, cuprous oxide and cuprous perchlorate. When such a copper compound is used, a ligand, such as 2,2'-bipyridyl or a derivative thereof, 1,10-phenanthroline or a derivative thereof, tetramethylethylenediamine, pentamethyldiethylenetriamine, hexamethyltris (2-aminoethyl) amine or a like polyamine, is added for increasing the catalytic activity. The tristriphenylphosphine complex of divalent ruthenium chloride ($RuCl_2(PPh_3)_3$) is also suited for use as the catalyst. When a ruthenium compound is used as the catalyst, an aluminum alkoxide is added as an activator. Further, a bistriphenylphosphine complex of divalent iron ($FeCl_2$ $(PPh_3)_2$), a bistriphenylphosphine complex of divalent nickel ($NiCl_2(PPh_3)_2$) and a bistributylphosphine complex of divalent nickel ($NiBr_2$ $(PBu_3)_2$) are also suitable as the catalyst.

The vinyl monomer(s) to be used in this polymerization is(are) not particularly restricted but may be any of those specifically illustrated hereinabove.

The above polymerization reaction can be carried out in the absence or presence of any of various solvents. As the solvent, there may be mentioned, among others, hydrocarbon solvents such as benzene and toluene; ether solvents such as diethyl ether, tetrahydrofuran, diphenyl ether, anisole and dimethoxybenzene; halogenated hydrocarbon solvents such as methylene chloride, chloroform and chlorobenzene; ketone solvents such as acetone, methyl ethyl ketone and methyl isobutyl ketone; alcohol solvents such as methanol, ethanol, propanol, isopropanol, n-butyl alcohol and tert-butyl alcohol: nitrile solvents such as acetonitrile, propionitrile and benzonitrile; ester solvents such as ethyl acetate and butyl acetate; and carbonate solvents such as ethylene carbonate and propylene carbonate. These may be used singly or two or more of them may be used combinedly. It is also possible to carry out the polymerization in an emulsion system or in a system in which supercritical fluid $CO_2$ is used as the medium.

Said polymerization can be carried out within the temperature range of 0 to 200° C., preferably within the range of room temperature to 150° C.

Now, several specific methods of producing the vinyl polymer having at least one alkenyl group represented by the general formula (1) are described be low under (A) to (C). These, however, have no limitative meaning.

(A) Method comprising directly introducing an alkenyl group into the polymer main chain in the step of synthesizing a vinyl polymer by radical polymerization;

(B) Method comprising using a vinyl polymer having at least one halogen-containing group represented by the general formula (2):

(in which $R^2$ and $R^3$ each represents a group bound to an ethylenically unsaturated group of a vinyl monomer and X represents chlorine, bromine or iodine) and substituting an alkenyl-containing functional group for the halogen atom:

(C) Method comprising using a vinyl polymer having at least one hydroxy group and substituting an alkenyl-containing functional group for the hydroxy group.

The above-mentioned method (A), which comprises directly introducing an alkenyl group into the polymer main chain, specifically includes, among others, the following methods (A-a) and (A-b) mentioned below.

(A-a) Method comprising subjecting a compound having a polymerizable alkenyl group and an alkenyl group having low polymerizability in one molecule, namely a compound represented by the general formula (9) shown below, together with the predetermined vinyl monomer(s), to reaction in the step of synthesizing a vinyl polymer by living radical polymerization:

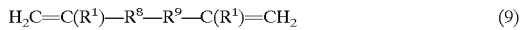

wherein $R^1$ represents a hydrogen atom or a methyl group and said two groups may be the same or different; $R^8$ represents —C(O)O— (ester group) or an o-, m- or p-phenylene group; $R^9$ represents a direct bond or a divalent organic group containing 1 to 20 carbon atoms, which may optionally contain one or more ether bonds. When $R^8$ is an ester group, said compound is a (meth)acrylate compound and, when $R^8$ is a phenylene group, said compound is a styrenic compound. As examples of the divalent organic group $R^9$, which contains 1 to 20 carbon atoms and may optionally contain one or more ether bonds, there may be mentioned alkylene groups such as methylene, ethylene and propylene; O-, m-, p-phenylene groups; aralkyl groups such as benzyl group; and ether bond-containing alkylene groups such as —$CH_2CH_2O$—$CH_2$— and —O—$CH_2$—.

Among the above-mentioned compounds of the general formula (9), the following are preferred because of ready availability:

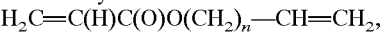
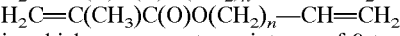
in which n represents an integer of 0 to 20;
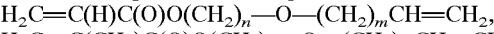
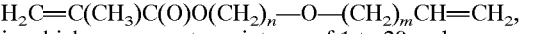
in which n represents an integer of 1 to 20 and m represents an integer of 0 to 20;
o-, m-, p-divinylbenzene,
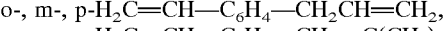
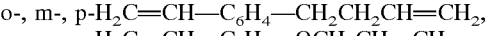
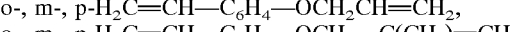
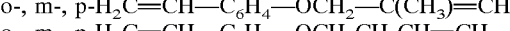
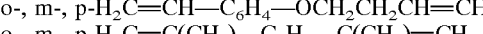
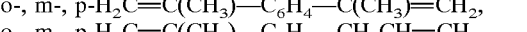
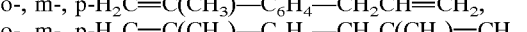
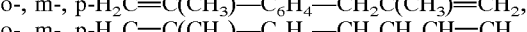
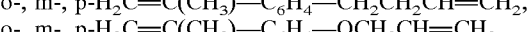
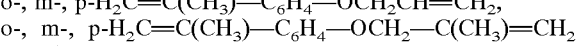
and
o-, m-, p-$H_2C$=$C(CH_3)$—$C_6H_4$—$OCH_2CH_2CH$=$CH_2$
in which $C_6H_4$ denotes a phenylene group.

The time for subjecting the compound, which has a polymerizable alkenyl group and an alkenyl group having low polymerizability, to reaction is not particularly restricted but it is preferred that said compound be subjected to reaction as a second monomer at the final stage of living radical polymerization or after completion of the reaction of the predetermined monomer.

(A-b) Method comprising subjecting a compound having at least two alkenyl groups having low polymerizability to reaction as a second monomer at the final stage of polymerization or after completion of the reaction of the predetermined monomer in synthesizing a vinyl polymer by living radical polymerization.

Such compound is not particularly restricted but includes, among others, compounds represented by the general formula (10):

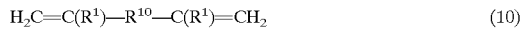

wherein $R^1$ represents a hydrogen atom or a methyl group and said two groups may be the same or different; $R^{10}$ represents a divalent organic group containing 1 to 20 carbon atoms, which may optionally contain one or more ether bonds.

The above-mentioned compound of the general formula (10) is not particularly restricted but 1,5-hexadiene, 1,7-octadiene and 1,9-decadiene are preferred because of ready availability.

In synthesizing the vinyl polymer having at least one alkenyl group by directly introducing an alkenyl group into the polymer main chain according to the above synthesis method (A), the method (A-b) is preferred because the alkenyl groups introduced per one molecule can be easily controlled.

In synthesizing the vinyl polymer having at least one halogen-containing group represented by the general formula (2) in carrying out the above-mentioned method (B), atom transfer radical polymerization is preferably employed. The method of substituting the halogen of this polymer with an alkenyl-containing functional group is not particularly restricted but specifically includes the methods (B-a) to (B-d) mentioned below.

(B-a) Method comprising reacting one of various alkenyl-containing organometallic compounds with the vinyl polymer having at least one halogen-containing group of the general formula (2) to thereby effect substitution of the halogen.

As such organometallic compounds, there may be mentioned organolithium, organosodium, organopotassium, organomagnesium, organotin, organosilicon, organozinc, organocopper and like compounds. In particular, organotin and organocopper compounds are preferred since they can react selectively with said halogen in the general formula (2) and are low in reactivity with the carbonyl group.

The alkenyl-containing organotin compound to be used is not particularly restricted but compounds represented by the following general formula (11) are preferred:

$$H_2C=C(R^1)C(R^{11})(R^{12})Sn(R^{13})_3 \quad (11)$$

wherein $R^1$ is as defined above; each of $R^{11}$ and $R^{12}$ represents a hydrogen atom, an alkyl group containing 1 to 10 carbon atoms, an aryl group containing 6 to 10 carbon atoms or an aralkyl group containing 7 to 10 carbon atoms, and these may be the same or different; and $R^{13}$ represents an alkyl group having 1 to 10 carbon atoms, an aryl group or an aralkyl group.

As specific examples of the organotin compounds of the general formula (11), there maybe mentioned allyltributyltin, allyltrimethyltin, allyltri(n-octyl)tin and allyltri(cyclohexyl)tin, among others.

As the alkenyl-containing organocopper compounds, there may be mentioned divinylcopperlithium, diallylcopperlithium and diisopropenylcopperlithium, among others.

(B-b) Method comprising reacting an alkenyl-containing stabilized carbanion represented, for instance, by the general formula (12) shown below with the vinyl polymer having at least one halogen-containing group represented by the general formula (2) to thereby effect substitution of the halogen:

$$M^+C^-(R^6)(R^7)-R^5-C(R^1)=CH_2 \quad (12)$$

wherein $R^1$, $R^5$, $R^6$ and $R^7$ are as defined above and $M^+$ represents an alkali metal ion or a quaternary ammonium ion.

As the alkali metal ion, there may be mentioned the lithium ion, sodium ion and potassium ion and, as the quaternary ammonium ion, there may be mentioned the tetramethylammonium ion, tetraethylammonium ion, trimethylbenzylamminium ion, trimethyldodecylammonium ion and tetrabutylammonium ion, among others.

The above-mentioned carbanion of the general formula (12) can be obtained by reacting a precursor thereof with a basic compound to thereby effect withdrawal of the active proton.

As the precursor of the carboanion of the general formula (12), there may be mentioned, among others, the following:
$H_2C=CH-CH(CO_2CH_3)_2$, $H_2C=CH-CH(CO_2C_2H_5)_2$,
$H_2C=CH-(CH_2)_nCH(CO_2CH_3)_2$, $H_2C=CH-(CH_2)_nCH(CO_2C_2H_5)_2$,
o-, m-, p-$H_2C=CH-C_6H_4-CH(CO_2CH_3)_2$,
o-, m-, p-$H_2C=CH-C_6H_4-CH(CO_2C_2H_5)_2$,
o-, m-, p-$H_2C=CH-C_6H_4-CH_2CH(CO_2CH_3)_2$,
o-, m-, p-$H_2C=CH-C_6H_4-CH_2CH(CO_2C_2H_5)_2$,
$H_2C=CH-CH(C(O)CH_3)(CO_2C_2H_5)$,
$H_2C=CH-(CH_2)_nCH(C(O)CH_3)(CO_2C_2H_5)$,
o-, m-, p-$H_2C=CH-C_6H_4-CH(C(O)CH_3)(CO_2C_2H_5)$,
o-, m-, p-$H_2C=CH-C_6H_4-CH_2CH(C(O)CH_3)(CO_2C_2H_5)$,
$H_2C=CH-CH(C(O)CH_3)_2$, $H_2C=CH-(CH_2)_nCH(C(O)CH_3)_2$,
o-, m-, p-$H_2C=CH-C_6H_4-CH(C(O)CH_3)_2$,
o-, m-, p-$H_2C=CH-C_6H_4-CH_2CH(C(O)CH_3)_2$,
$H_2C=CH-CH(CN)(CO_2C_2H_5)$, $H_2C=CH-(CH_2)_nCH(CN)(CO_2C_2H_5)$,
o-, m-, p-$H_2C=CH-C_6H_4-CH(CN)(CO_2C_2H_5)$,
o-, m-, p-$H_2C=CH-C_6H_4-CH_2CH(CN)(CO_2C_2H_5)$,
$H_2C=CH-CH(CN)_2$, $H_2C=CH-(CH_2)CH(CN)_2$,
o-, m-, p-$H_2C=CH-C_6H_4-CH(CN)_2$,
o-, m-, p-$H_2C=CH-C_6H_4-CH_2CH(CN)_2$, $H_2C=CH-(CH_2)_nNO_2$,
o-, m-, p-$H_2C=CH-C_6H_4-CH_2NO_2$,
o-, m-, p-$H_2C=CH-C_6H_4-CH_2CH_2NO_2$,
$H_2C=CH-CH(C_6H_5)(CO_2C_2H_5)$, $H_2C=CH-(CH_2)_nCH(C_6H_5)(CO_2C_2H_5)$,
o-, m-, p-$H_2C=CH-C_6H_4-CH(C_6H_5)(CO_2C_2H_5)$,
o-, m-, p-$H_2C=CH-C_6H_4-CH_2CH(C_6H_5)(CO_2C_2H_5)$ In the above formulas, n represents an integer of 1 to 10.

Various basic compounds may be used for withdrawing the proton from such compounds as mentioned above to give the corresponding carbanions of the general formula (12). As such basic compounds, there may be mentioned, among others, the following:

alkali metals such as sodium, potassium and lithium; metal alkoxides such as sodiummethoxide, potassiummethoxide, lithium methoxide, sodium ethoxide, potassium ethoxide, lithium ethoxide, sodium tert-butoxide and potassium tert-butoxide;

carbonates such as sodium carbonate, potassium carbonate, lithium carbonate and sodium hydrogen carbonate;

hydroxides such as sodium hydroxide and potassium hydroxide;

hydrides such as sodium hydride, potassium hydride, methyllithium, ethyllithium;

organometals such as n-butyllithium, tert-butyllithium, lithiumdiisopropylamide and lithiumhexamethyldisilazide; ammonia;

alkylamines such as trimethylamine, triethylamine and tributylamine;

polyamines such as tetramethylethylenediamine and pentamethyldiethylenetriamine;

pyridine compounds such as pyridine and picoline; etc.

The basic compound is used in an amount equivalent to or in small excess relative to the precursor, preferably in an amount of 1 to 1.2 equivalents.

A quaternary ammonium salt may also be used as the above carbanion. In that case, an alkali metal salt of a carboxylic acid compound is prepared and this is then reacted with a quaternary ammonium halide. The quaternary ammonium halide includes, among others, tetramethylammonium halides, tetraethylammonium halides, trimethylbenzylammonium halides, trimethyldodecylammonium halides and tetrabutylammonium halides.

As the solvent to be used in reacting the above precursor with the above basic compound, there may be mentioned, among others, hydrocarbon solvents such as benzene and toluene; ether solvents such as diethyl ether, tetrahydrofuran, diphenyl ether, anisole and dimethoxybenzene; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; and sulfoxide solvents such as dimethyl sulfoxide. These may be used singly or two or more may be used in admixture.

The carbanion represented by the general formula (12) can be prepared by reacting the above precursor with the above basic compound, and the desired vinyl polymer terminally having an alkenyl group represented by the general formula (1) can be obtained by reacting the carbanion with a vinyl polymer having a halogen-containing terminus of the general formula (2).

(B-c) Method comprising a vinyl polymer having at least one halogen-containing group of the general formula (2) with an elementary metal or an organometallic compound and then reacting the resulting enolate anion with an alkenyl-containing electrophilic compound.

Particularly referred as the elemental metal is zinc since, when it is used, side reactions of the resulting enolate anion, such as attack on other ester groups or rearrangement thereof hardly occur. Various compounds can be used as the alkenyl-containing electrophilic compound. For example, there can be mentioned alkenyl-containing compounds having a leaving group such as a halogen atom or an acetyl group, alkenyl-containing carbonyl compounds, alkenyl-containing isocyanate compounds and alkenyl-containing acid halides. Among these, those alkenyl-containing compounds which have a leaving group such as a halogen atom or an acetyl group are preferred since, when they are used, no atoms other than carbon atoms are introduced into the main chain, hence the weathering resistance of the vinyl polymer will not be lost.

(B-d) Method comprising reacting a vinyl polymer having at least one halogen-containing group of the general formula (2) with an alkenyl-containing oxy anion represented, for example, by the general formula (13) shown below or an alkenyl-containing carboxylate anion represented, for example, by the general formula (14) shown below to thereby effect substitution of the alkenyl-containing group for said halogen.

$$CH_2=C(R^1)-R^5-O^-M^+ \tag{13}$$

wherein $R^1$, $R^5$ and $M^+$ are as defined above;

$$CH_2=C(R^1)-R^5-C(O)O^-M^+ \tag{14}$$

wherein $R^1$, $R^5$ and $M^+$ are as defined above.

As precursors of the oxy anions represented by the general formula (13) or (14), there may be mentioned the following compounds:

$H_2C=CH-CH_2-OH$, $H_2C=CH-CH(CH_3)-OH$, $H_2C=C(CH_3)-CH_2-OH$, $H_2C=CH-(CH_2)_n-OH$ (n representing an integer of 2 to 20), $H_2C=CH-CH_2-O-(CH_2)_2-OH$, $H_2C=CH-C(O)O-(CH_2)_2-OH$, $H_2C=C(CH_3)-C(O)O-(CH_2)_2-OH$, o-, m-, p-$H_2C=CH-C_6H_4-CH_2-OH$, o-, m-, p-$H_2C=CH-CH_2-C_6H_4-CH_2-OH$, o-, m-, p-$H_2C=CH-CH_2-O-C_6H_4-CH_2-OH$ and like alcoholic hydroxy-containing compounds;

o-, m-, p-$H_2C=CH-C_6H_4-OH$, o-, m-, p-$H_2C=CH-CH_2-C_6H_4-OH$, o-, m-, p-$H_2C=CH-CH_2-O-C_6H_4-OH$ and like phenolic hydroxy-containing compounds;

$H_2C=CH-C(O)-OH$, $H_2C=C(CH_3)-C(O)-OH$, $H_2C=CH-CH_2-C(O)-OH$, $H_2C=CH-(CH_2)_n-C(O)-OH$ (n representing an integer of 2 to 20), $H_2C=CH-(CH_2)_n-OC(O)-(CH_2)_m-C(O)-OH$ (m and n being the same or different and each representing an integer of 0 to 19), o-, m-, p-$H_2C=CH-C_6H_4-C(O)-OH$, o-, m- p-$H_2C=CH-CH_2-C_6H_4-C(O)-OH$, o-, m-, p-$H_2C=CH-CH_2-O-C_6H_4-C(O)-OH$, o-, m-, p-$H_2C=CH-(CH_2)_n-OC(O)-C_6H_4-C(O)OH$ (n representing an integer of 0 to 13) and like carboxyl-containing compounds.

Various basic compounds are used for withdrawing the proton from the above compounds to give the anions of said general formula (13) or (14) and, as specific examples thereof, those basic compounds which are to be used in preparing the above-mentioned carbanions of the general formula (12) are all suited for use. As for the solvent, those useful in preparing the carbanions are all suited for use.

Among the above synthetic methods falling under (B), the method comprising converting the halogen of a vinyl polymer having at least one halogen-containing group of the general formula (2) as obtained by atom transfer radical polymerization using an organic halide or halogenated sulfonyl compound as the initiator and a transition metal complex as the catalyst, to thereby introduce an alkenyl group by the method (B-d) is preferred, since a high rate of alkenyl group introduction can be realized by said method. Among the modifications of method (B-d), the one comprising reacting an alkenyl-containing carboxylate anion represented, for example, by the general formula (14) is more preferred.

In the process of producing a vinyl polymer which comprises using the atom transfer radical polymerization technique with an organic halide or halogenated sulfonyl compound as the initiator and a transition metal complex as the catalyst, the use of an alkenyl-containing organic halide as the initiator can result in formation of a vinyl polymer having an alkenyl group at one terminus and the above structure of the general formula (2) at the other terminus. By converting the halogen at the termination terminus of the thus-obtained polymer to an alkenyl-containing substituent, it is possible to obtain a vinyl polymer having an alkenyl group at both termini. For such conversion, the methods already mentioned hereinabove can be used.

The alkenyl-containing organic halide is not particularly restricted but includes, among others, compounds having a structure represented by the following general formula (15):

$$R^{14}R^{15}C(X)-R^{16}-R^9-C(R^1)=CH_2 \tag{15}$$

wherein $R^1$, $R^9$ and X are as defined above; they each represent a hydrogen atom or an alkyl group containing 1 to 20 carbon atoms, an aryl group containing 6 to 20 carbon atoms or an aralkyl group containing 7 to 20 carbon atoms and these may be bound together at the respective other ends; and $R^{16}$ represents —C(O)O— (ester group), —C(O)— (keto group) or an o-, m- or p-phenylene group.

As specific examples of the alkenyl-containing organic halide of the general formula (15), there may be mentioned the following compounds:

$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$,
$CH_3CH_2C(H)(X)C(O)O(CH_2)_nCH=CH_2$

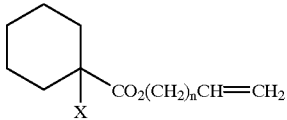

in the above formulas, X represents chlorine, bromine or iodine and n represents an integer of 0 to 20;
$XCH_2C(O)O(CH_2)_nO(CH_2)_mCH=CH_2$,
$H_3CC(H)(X)C(O)O(CH_2)_nO(CH_2)_mCH=CH_2$,
$(H_3C)_2C(X)C(O)O(CH_2)_nO(CH_2)_mCH=CH_2$,
$CH_3CH_2C(H)(X)C(O)O(CH_2)_nO(CH_2)_mCH=CH_2$,

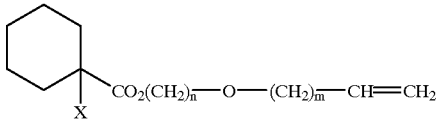

in the above formulas, X represents chlorine, bromine or iodine, n represents an integer of 1 to 20 and m represents an integer of 0 to 20;
o, m, p-$XCH_2$—$C_6H_4$—$(CH_2)_n$—$CH=CH_2$,
o, m, p-$CH_3C(H)(X)$—$C_6H_4$—$(CH_2)_n$—$CH=CH_2$,
o, m, p-$CH_3CH_2C(H)(X)$—$C_6H_4$—$(CH_2)_n$—$CH=CH_2$,
in the above formulas, X represents chlorine, bromine or iodine and n represents an integer of 0 to 20;
o, m, p-$XCH_2$—$C_6H_4$—$(CH_2)_n$—O—$(CH_2)_m$—$CH=CH_2$,
o, m, p-$CH_3C(H)(X)$—$C_6H_4$—$(CH_2)_n$—O—$(CH_2)_m$—$CH=CH_2$,
o, m, p-$CH_3CH_2C(H)(X)$—$C_6H_4$—$(CH_2)_n$—O—$(CH_2)_m$—$CH=CH_2$,
in the above formulas, X represents chlorine, bromine or iodine, n represents an integer of 1 to 20 and m represents an integer of 0 to 20;
o, m, p-$XCH_2$—$C_6H_4$—O—$(CH_2)_n$—$CH=CH_2$,
o, m, p-$CH_3C(H)(X)$—$C_6H_4$—O—$(CH_2)_n$—$CH=CH_2$,
o, m, p-$CH_3CH_2C(H)(X)$—$C_6H_4$—O—$(CH_2)_n$—$CH=CH_2$,
in the above formulas, X represents chlorine, bromine or iodine and n represents an integer of 0 to 20;
o, m, p-$XCH_2$—$C_6H_4$—O—$(CH_2)_n$—O—$(CH_2)_m$—$CH=CH_2$,
o, m, p-$CH_3C(H)(X)$—$C_6H_4$—O—$(CH_2)_n$—O—$(CH_2)_m$—$CH=CH_2$,
o, m, p-$CH_3CH_2C(H)(X)$—$C_6H_4$—O—$(CH_2)_n$O—$(CH_2)_m$—$CH=CH_2$,
in the above formulas, X represents chlorine, bromine or iodine, n represents an integer of 1 to 20 and m represents an integer of 0 to 20.

As the alkenyl-containing organic halide, there may further be mentioned compounds represented by the general formula (16):

$$H_2C=C(R^1)-R^9-C(R^{14})(X)-R^{17}-R^{15} \qquad (16)$$

wherein $R^1$, $R^9$, $R^{14}$, $R^{15}$ and X are as defined above; $R^{17}$ represents a direct bond, —C(O)O— (ester group), —C(O)— (keto group) or an o-, m- or p-phenylene group.

$R^9$ is a direct bond or a divalent organic group containing 1 to 20 carbon atoms (optionally containing one or more ether bonds) and, when it is a direct bond, a vinyl group is bound to the carbon atom to which the halogen is bound, forming an allyl halide. In that case, the carbon-halogen bond is activated by the adjacent vinyl group and therefore it is not always necessary that $R^{17}$ be a C(O)O or phenylene group or the like, so that $R^{17}$ may be a direct bond. When $R^9$ is other than a direct bond, a C(O)O, C(O) or phenylene group is preferred as $R^{17}$ so that the carbon-halogen bond may be activated.

As specific examples of the compound of the general formula (16), there may be mentioned the following compounds:
$CH_2=CHCH_2X$, $CH_2=C(CH_3)CH_2X$, $CH_2=CHC(H)(X)CH_3$,
$CH_2=C(CH_3)C(H)(X)CH_3$, $CH_2=CHC(X)(CH_3)_2$, $CH_2=CHC(H)(X)C_2H_5$,
$CH_2=CHC(H)(X)CH(CH_3)_2$, $CH_2=CHC(H)(X)C_6H_5$, $CH_2=CHC(H)(X)CH_2C_6H_5$,
$CH_2=CHCH_2C(H)(X)$—$CO_2R$, $CH_2=CH(CH_2)_2C(H)(X)$—$CO_2R$,
$CH_2=CH(CH_2)_3C(H)(X)$—$CO_2R$, $CH_2=CH(CH_2)_8C(H)(X)$—$CO_2R$,
$CH_2=CHCH_2C(H)(X)$—$C_6H_5$, $CH_2=CH(CH_2)_2C(H)(X)$—$C_6H_5$,
$CH_2=CH(CH_2)_3C(H)(X)$—$C_6H_5$ In each formula as mentioned above, X represents chlorine, bromine or iodine and R represents an alkyl group having 1 to 20 carbon atoms, an aryl group or an aralkyl group.

As specific examples of the alkenyl-containing halogenated sulfonyl compound, there may be mentioned the following compounds:
o-, m-, p—$CH_2=CH$—$(CH_2)_n$—$C_6H_4$—$SO_2X$,
o-, m-, p—$CH_2=CH$—$(CH_2)_n$—O—$C_6H_4$—$SO_2X$ In each formula as mentioned above, X represents chlorine, bromine or iodine and n represents an integer of 0 to 20.

When an alkenyl-containing organic halide or halogenated sulfonyl compound or the like is used as the initiator, a polymer having the alkenyl group at one terminus and the halogen-containing group of the general formula (2) at the other terminus can be obtained. By coupling two molecules of this polymer together at their respective halogen termini using a compound having a total of two or more functional groups, which may be the same or different and capable of substituting the halogen represented by the general formula (2) in this polymer, it is possible to obtain an alkenyl-terminated vinyl polymer.

The compound having a total of two or more, same or different functional groups each capable of substituting the terminal halogen is not particularly restricted but polyols, polyamines, polycarboxylic acids, polythiols, and salts thereof, and alkali metal sulfides are preferred. As specific examples of such compounds, there may be mentioned the following compounds:

polyols such as ethylene glycol, 1,2-propanediol, 1,3-propanediol, 2-methyl-1,3-propanediol, 2,2-dimethyl-1,3-propanediol, 1,4-butanediol, 1,3-butanediol, 1,2-butanediol, 2,3-butanediol, pinacol, 1,5-pentanediol, 1,4-pentanediol, 2,4-pentanediol, 1,6-hexanediol, 1,7-heptanediol, 1,8-octanediol, 1,9-nonanediol, 1,10-decanediol, 1,12-dodecanediol, 1,2-cyclopentanediol, 1,3-cyclopentanediol, 1,2-cyclohexanediol, 1,3-cyclohexanediol, 1,4-cyclohexanediol, glycerol, 1,2,4-butanetriol, catechol, resorcinol, hydroquinone, 1,2-dihydroxynaphthalene, 1,3-dihydroxynaphthalene, 1,5-dihydroxynaphthalene, 2,6-dihydroxynaphthalene, 2,2'-biphenol, 4,4'-biphenol, bis(4-hydroxyphenyl)methane, 4,4'-isopropylidenephenol, 3,3'-(ethylenedioxy)diphenol, a,a'-dihydroxy-p-xylene, 1,1,1-tris(4-hydroxyphenyl)ethane, pyrogallol and 1,2,4-benzenetriol; alkali metal salts of such polyol compounds; polyamines such as ethylenediamine, 1,3-diaminopropane, 1,2-diaminopropane, 1,4-diaminobutane, 1,2-diamino-2-methylpropane, 1,5-diaminopentane, 2,2-dimethyl-1,3-propanediamine, 1,6-hexanediamine, 1,7-heptanediamine, 1,8-octanediamine, 1,9-diaminononane, 1,10-diaminodecane, 1,12-diaminododecane, 4,4'-methylenebis(cyclohexylamine), 1,2-diaminocyclohexane, 1,3-diaminocyclohexane, 1,4-diaminocyclohexane, 1,2-phenylenediamine, 1,3-phenylenediamine, 1,4-phenylenediamine and á,á'-diamino-p-xylene; and alkali metal salts of said polyamine compounds; polycarboxylic acids such as oxalic acid, malonic acid, methylmalonic acid, dimethylmalonic acid, succinic acid, methylsuccinic acid, glutaric acid, adipic acid, 1,7-heptanedicarboxylic acid, 1,8-octanedicarboxylic acid, 1,9-nonanedicarboxylic acid, 1,10-decanedicarboxylic acid, 1,11-undecanedicarboxylic acid, 1,12-dodecanedicarboxylic acid, 1,2-cyclopentanedicarboxylic acid, 1,2-cyclohexanedicarboxylic acid, 1,3-cyclohexanedicarboxylic acid, 1,4-cyclohexanedicarboxylic acid, 1,3,5-cyclohexanetricarboxylic acid, phthalic acid, isophthalic acid, terephthalic acid, 1,2,3-benzenetricarboxylic acid and 1,2,4,5-benzenetetracarboxylic acid; alkali metal salts of such polycarboxylic acids; polythiols such as 1,2-ethanedithiol, 1,3-propanedithiol, 1,4-butanedithiol, 2,3-butanedithiol, 1,5-pentanedithiol, 1,6-hexanedithiol, 1,7-heptanedithiol, 1,8-octanedithiol, 1,9-nonanedithiol, 2-mercaptoethyl ether, p-xylene-á,á'-dithiol, 1,2-benzenedithiol, 1,3-benzenedithiol and 1,4-benzenedithiol;

alkali metal salts of such polythiol compounds; and alkali metal sulfides such as lithium sulfide, sodium sulfide and potassium sulfide.

When such a polyol, polyamine, polycarboxylic acid or polythiol is used, a basic compound is combinedly used for promoting the substitution reaction. As specific examples thereof, there may be mentioned those already mentioned hereinabove.

The method of substituting an alkenyl-containing functional group for the hydroxy group by using a vinyl polymer having at least one hydroxy group according to the above-mentioned synthetic method (C) is not particularly restricted but specifically includes, among others, the following methods (C-a) to (C-d).

(C-a) Method comprising reacting the hydroxy group of a vinyl polymer having at least one hydroxy group with a base such as sodium hydroxide or potassium methoxide and then reacting the resulting compound with an alkenyl-containing halide such as allyl chloride;

(C-b) Method comprising reacting a vinyl polymer having at least one hydroxy group with an alkenyl-containing isocyanate compound such as allyl isocyanate;

(C-c) Method comprising reacting a vinyl polymer having at least one hydroxy group with an alkenyl-containing acid halide, such as (meth)acryloyl chloride, in the presence of a base such as pyridine; and (C-d) Method comprising reacting a vinyl polymer having at least one hydroxy group with an alkenyl-containing carboxylic acid, such as acrylic acid, in the presence of an acid catalyst.

The method of producing the vinyl polymer having at least one, hydroxy group, which is to be used in method (C), includes the following methods (D-a) to (D-f), but is not limited to these methods.

(D-a) Method comprising subjecting a compound having a polymerizable alkenyl group and a hydroxy group in one molecule as represented, for example, by the general formula (17) shown below to reaction as a second monomer in the step of synthesizing a vinyl polymer by living radical polymerization:

$$H_2C=C(R^1)-R^8-R^9-OH \qquad (17)$$

wherein $R^1$, $R^8$ and $R^9$ are as defined above.

The time of subjecting the compound having a polymerizable alkenyl group and a hydroxy group in one molecule to reaction is not restricted but, in particular when rubber-like properties are expected, it is preferred that such compound be subjected to reaction as a second monomer at the final stage of polymerization reaction or after completion of the reaction of the predetermined monomer.

(D-b) Method comprising subjecting a compound which has an alkenyl group having low polymerizability and a hydroxy group in one molecule to reaction as a second monomer at the final stage of polymerization reaction or after completion of the reaction of the predetermined monomer in the step of synthesizing a vinyl polymer by living radical polymerization.

Such compound is not particularly restricted but includes, among others, compounds represented by the general formula (18)

$$H_2C=C(R^1)-R^{10}-OH \qquad (18)$$

wherein $R^1$ and $R^{10}$ are as defined above.

The compound of the general formula (18) is not particularly restricted but alkenyl alcohols such as 10-undecenol, 5-hexenol and allyl alcohol are preferred because of ready availability.

(D-c) Method comprising subjecting the halogen of a vinyl polymer having at least one carbon-halogen bond as represented by the general formula (2), which is obtainable by atom transfer radical polymerization, to hydrolysis or reaction with a hydroxy-containing compound to terminally introduce a hydroxy group, as disclosed in Japanese Kokai Publication Hei-04-132706.

(D-d) Method comprising reacting a vinyl polymer having at least one carbon-halogen bond as represented by the general formula (2), which is obtainable by a transfer radical polymerization, with a hydroxy-containing stabilized carbanion represented, for example, by the general formula (19) to thereby effect substitution of the halogen:

$$M^+C^-(R^6)(R^7)-R^5-OH \qquad (19)$$

wherein $R^5$, $R^6$ and $R^7$ are as defined above.

(D-e) Method comprising reacting a vinyl polymer having at least one carbon-halogen bond as represented by the general formula (2), which is obtainable by atom transfer radical polymerization, with an elementary metal, such as zinc, or an organometallic compound to prepare enolate anion and then reacting the same with an aldehyde or ketone.

(D-f) Method comprising reacting a vinyl polymer having at least one halogen-containing group as represented by the general formula (2) with a hydroxy-containing oxy anion represented, for example, by the general formula (20) shown below or a hydroxy-containing carboxylate anion represented, for example, by the general formula (21) shown below to thereby substitute the corresponding hydroxy-containing substituent for the above halogen:

$$HO-R^5-O^{31} \ M^+ \qquad (20)$$

wherein $R^5$ and $M^+$ are as defined above;

$$HO—R^5—C(O)O^-M^+ \quad (21)$$

wherein $R^5$ and $M^+$ are as defined above.

In the present invention, the method (D-b) is more preferred when no halogen is directly involved in hydroxy group introduction as in the methods (D-a) and (D-b), since the method (D-b) is easier to control.

When hydroxy group introduction is effected by converting the halogen of a vinyl polymer having at least one carbon-halogen bond as represented by the general formula (2), as in the case of (D-c) to (D-f), the method (D-f) is more preferred because of ease of control.

(B) Component, Namely Hydrosilyl Group-containing Compound

The (B) component hydrosilyl-containing compound is not particularly restricted but may be any of various compounds. Thus, use may be made of linear polysiloxanes represented by the general formula (22) or (23):

$$R^{18}{}_3SiO—[Si(R^{18})_2O]_a—[Si(H)(R^{19})O]_b—[Si(R^{19})(R^{20})O]_c—SiR^{18}{}_3 \quad (22)$$

$$HR^{18}{}_2SiO—[Si(R^{18})_2O]_a—[Si(H)(R^{19})O]_b—[Si(R^{19})(R^{20})O]_c—SiR^{18}{}_2H \quad (23)$$

wherein $R^{18}$ and $R^{19}$ each represents an alkyl group containing 1 to 6 carbon atoms or a phenyl group; $R^{20}$ represents an alkyl group having 1 to 10 carbon atoms or an aralkyl group; a represents integers satisfying the relation $0 \leq a \leq 100$, b represents integers satisfying the relation $2 \leq b \leq 100$ and c represents integers satisfying the relation $0 \leq c \leq 100$; and cyclic siloxanes represented by the general formula (24):

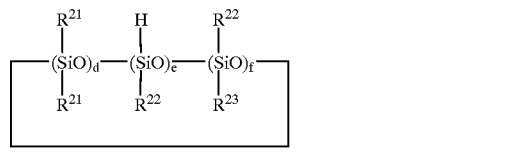

(24)

wherein $R^{21}$ and $R^{22}$ each represents an alkyl group containing 1 to 6 carbon atoms or a phenyl group; $R^{23}$ represents an alkyl group having 1 to 10 carbon atoms or an aralkyl group; d represents integers satisfying the relation $0 \leq d \leq 8$, e represents integers satisfying the relation $2 \leq e \leq 10$ and f represents integers satisfying the relation $0 \leq f \leq 8$, and these satisfy the condition $3 \leq d+e+f \leq 10$; among others.

These may be used singly or two or more of them may be used in admixture. Among these siloxanes, phenyl-containing linear siloxanes represented by the general formula (25) or (26) shown below and cyclic siloxanes represented by the general formula (27) or (28) shown below are preferred from the viewpoint of compatibility:

$$(CH_3)_3SiO—[Si(H)(CH_3)O]_g—[Si(C_6H_5)_2O]_h—Si(CH_3)_3 \quad (25)$$

$$(CH_3)_3SiO—[Si(H)(CH_3)O]_g—[Si(CH_3)\{CH_2C(H)(R^{24})C_6H_5\}O]_h—Si(CH_3)_3 \quad (26)$$

wherein $R^{24}$ represents a hydrogen atom or a methyl group; g represents the relation $2 \leq g \leq 100$ and h represents integers satisfying the relation $0 \leq h \leq 100$; and $C_6H_5$ denotes a phenyl group;

(27)

(28)

wherein $R^{24}$ represents a hydrogen atom or a methyl group; i represents integers satisfying the relation $2 \leq i \leq 10$ and j represents integers satisfying the relation $0 \leq j \leq 8$ and these satisfy the condition $3 \leq i+j \leq 10$; and $C_6H_5$ denotes a phenyl group.

Also usable as the (B) component compound having at least one hydrosilyl group are those compounds which are obtained by subjecting a hydrosilyl-containing compound represented by one of the general formulas (22) to (28) to addition reaction to a low-molecular compound having two or more alkenyl groups per molecule in a manner such that the hydrosilyl group partly remains after the reaction.

Usable as the compound having two or more alkenyl groups per molecule are various compounds, for example 1,4-pentadiene, 1,5-hexadiene, 1,6-heptadiene, 1,7-octadiene, 1,8-nonadiene, 1,9-decadiene and like hydrocarbon compounds; O,O'-diallylbisphenol A, 3,3'-diallylbisphenol A and like ether compounds; diallyl phthalate, diallyl isophthalate, triallyl trimellitate, tetraallyl pyromellitate and like ester compounds; diethylene glycol diallyl carbonate and like carbonate compounds.

The compounds in question can be obtained by slowly adding the above alkenyl-containing compound dropwise to an excessive amount of said hydrosilyl-containing compound represented by one of the general formulas (22) to (28) in the presence of a hydrosilylation catalyst. Among such compounds, the following are preferred in view of ready raw material availability, ease of removal of the siloxane used in excess and, further, compatibility with the (A) component polymer:

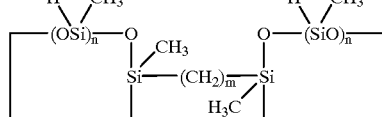

(29)

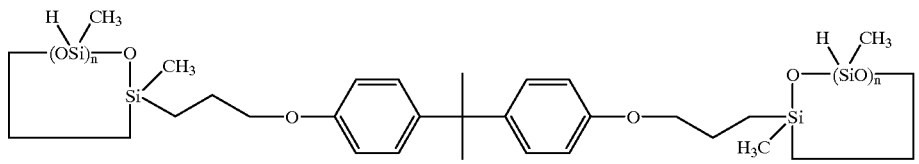

(30)

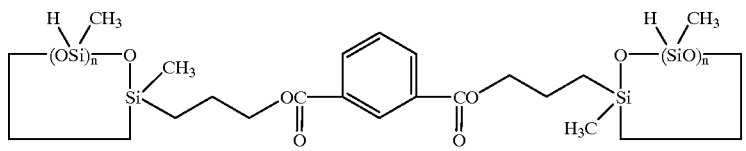

(31)

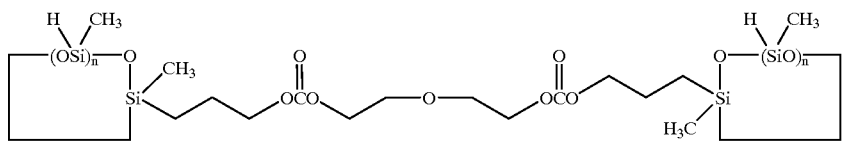

(32)

In each formula, n represents an integer of 2 to 4 and m represents an integer of 5 to 10.

Method of Producing Cured Products

The polymer (A) and curing agent (B) may be blended in an arbitrary ratio. From the viewpoint of curability, however, said ratio is preferably within the alkenyl group-to-hydrosilyl group mole ratio range of 5 to 0.2, more preferably 2.5 to 0.4. When said mole ratio is not less than 5, curing will be insufficient and the cured products will be sticky and have low strength. When it is not more than 0.2, an active hydrosilyl group will remain in large amounts in cured products even after curing, causing formation of cracks and voids, hence uniform cured products sufficient in strength will not be obtained.

The curing reaction between the polymer (A) and curing agent (B) can proceed upon blending of the two components and heating. For further promoting the reaction, however, a hydrosilylation catalyst may be added. As such hydrosilylation catalyst, there may be mentioned radical initiators, such as organic peroxides and azo compounds, and transition metal catalysts.

The radical initiator is not particularly restricted but may be any of various ones. As examples, there may be mentioned dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butyl cumyl peroxide and á,á'-bis(t-butylperoxy)isopropylbenzene; diacyl peroxides such as benzoyl peroxide, p-chlorobenzoyl peroxide, m-chlorobenzoyl peroxide, 2,4-dichlorobenzoyl peroxide and lauroyl peroxide; peroxy esters such as t-butyl perbenzoate; peroxydicarbonates such as diisopropyl peroxydicarbonate and di-2-ethylhexyl peroxydicarbonate; peroxyketals such as 1,1-di(t-butylperoxy)cyclohexane and 1,1-di(t-butylperoxy)-3,3,5-trimethylcyclohexane; and the like.

As the transition metal catalyst, there may be mentioned, among others, elementaryplatinum, a dispersion of solid platinum as supported on a carrier such as alumina, silica or carbon black, chloroplatinic acid, a complex of chloroplatinic acid with an alcohol, aldehyde, ketone or the like, platinum-olefin complexes and platinum(0)-divinyltetramethyldisiloxane complex. As catalysts other than platinum compounds, there may be mentioned, for example, $RhCl(PPh_3)_3$, $RhCl_3$, $RuCl_3$, $IrCl_3$, $FeCl_3$, $AlCl3$, $PdCl_2 \cdot H_2O$, $NiCl_2$, $TiCl_4$ and the like.

These hydrosilylation catalysts may be used singly or two or more of them may be used in combination. While the catalyst amount is not particularly restricted, the catalyst is preferably used in an amount within the range of $10^{-1}$ to $10^{-8}$ mole, preferably $10^{-3}$ to $10^{-6}$ mole, per mole of the alkenyl group of component (A). An amount less than $10^{-8}$ mole will lead to failure to attain sufficient curing. Since the hydrosilylation catalyst is expensive, it is preferred that this catalyst is used in an amount that is less than $10^{-1}$ mole.

The pressure sensitive adhesive composition of the present invention comprises a vinyl polymer as the main component and, therefore, the addition of a tackifier resin is not always necessary. If necessary, however, various ones may be used. As specific examples, there may be mentioned phenol resins, modified phenol resins, cyclopentadiene-phenol resins, xylene resins, coumarone resins, petroleum resins, terpene resins, terpene-phenol resins, rosin ester resins and the like.

In the pressure sensitive adhesive composition of the present invention, there may be incorporated various additives for modifying the physical properties, for example antioxidants, plasticizers, physical property modifiers and solvents.

Vinyl polymers are by nature excellent in durability, hence the use of an antioxidant is not always necessary. However, antioxidants and ultraviolet absorbers known in the art may be used where necessary or appropriate.

As for the plasticizer, one or a mixture of two or more of the following may be used according to the purpose of addition, for example modification of physical properties and/or modification of appearance or the like: phthalate esters such as dibutyl phthalate, diheptyl phthalate, di(2-ethylhexyl) phthalate and butyl benzyl phthalate; nonaromatic dibasic acid esters such as dioctyl adipate and dioctyl sebacate; polyalkylene glycol esters such as diethylene glycol dibenzoate and triethylene glycol dibenzoate; phosphate esters such as tricresyl phosphate and tributyl phosphate; chlorinated paraffins; hydrocarbon oils such as alkyldiphenyls and partially hydrogenated terphenyl; and the like. The use of plasticizers is not always necessary, however. These plasticizers may be added in the process of polymer production.

As the solvent, there may be mentioned aromatic hydrocarbon solvents such as toluene and xylene; ester solvents such as ethyl acetate, butyl acetate, amyl acetate and cellosolve acetate; and ketone solvents such as methyl ethyl ketone, methyl isobutyl ketone and diisobutyl ketone, among others. These solvents may be used in the process of polymer production.

Various adhesiveness modifiers maybe added to the pressure sensitive adhesive composition of the present invention for improving the adhesiveness thereof to various supports (plastic films, paper, etc.). Examples are alkylalkoxysilanes such as methyltrimethoxysilane, dimethyldimethoxysilane, trimethylmethoxysilane and n-propyltrimethoxysilane; functional group-containing alkoxysilanes, for example alkylisopropenoxysilanes such as dimethyldiisopropenoxysilane, methyltriisopropenoxysilane and ■-glycidoxy-propylmethyldiisopropenoxysilane, ■-glycidoxy-propylmethyldimethoxysilane, ■-glycidoxypropyl-trimethoxysilane, vinyltrimethoxysilane, vinyldimethylmethoxysilane, ■-aminopropyltrimethoxysilane, N-(■-aminoethyl)-■-aminopropyltrimethoxysilane, N-(■-aminoethyl)-■-aminopropylmethyldimethoxysilane, ■-mercaptopropyltrimethoxysilane and ■-mercaptopropylmethyldimethoxysilane; silicone varnishes; polysiloxanes; and the like.

The pressure sensitive adhesive composition can be widely applied to tapes, sheets, labels, foils and so forth. For instance, the pressure sensitive adhesive composition in the form of a solvent type, emulsion type or hot melt type composition is applied to substrate materials such as films made of a synthetic resin or a modified natural product, paper, various types of cloth, metal foils, metallized plastic foils, asbestos or glass fiber cloths, followed by heating for curing. Although the curing conditions are not particularly restricted, it is generally recommendable that curing be conducted at 0° C. to 200° C., preferably 30° C. to 150° C., more preferably 80° C. to 150° C., whereby pressure sensitive adhesives and the like can be obtained in a short period of time.

BEST MODES FOR CARRYING OUT THE INVENTION

The following examples specifically illustrate the invention. They are, however, by no means limitative of the scope of the present invention.

Synthesis Example 1

Synthesis of a Halogen-terminated Poly(n-butyl Acrylate)

A 50-mL flask was charged with 0.63 g (4.4 mmol) of cuprous bromide, 0.76 g (4.4 mmol) of pentamethyldiethylenetriamine, 5 mL of acetonitrile, 1.6 g (4.4 mmol) of diethyl 2,5-dibromoadipate and 44.7 g (349 mmol) of butyl acrylate and, after deaeration by freezing, the reaction was allowed to proceed in a nitrogen atmosphere at 70° C. for 7 hours. The copper catalyst was removed by passing the reaction mixture through an activated alumina column. This purification procedure gave a Br-terminated polymer. The polymer obtained had a number average molecular weight of 10,700 as determined by GPC analysis (mobile phase: chloroform; expressed in terms of polystyrene equivalent) with a molecular weight distribution of 1.15.

Synthesis of an Alkenyl-terminated Poly(n-butyl Acrylate)

In a nitrogen atmosphere, a 200-mL flask was charged with 35 g of the halogen-terminated poly(n-butyl acrylate) obtained in the above manner, 2.2 g (16.1 mmol) of potassium pentenoate and 35 mL of DMAc and the reaction was allowed to proceed at 70° C. for 4 hours. The unreaction portion of potassium pentenoate and the byproduct potassium bromide were removed from the reaction mixture by extraction with water, for purification. This polymer was mixed with an equal weight of aluminum silicate (Kyowaad 700 PEL; product of Kyowa Chemical) in toluene and the mixture was stirred at 100° C. Four hours later, the aluminum silicate was filtered off and the volatile matter was distilled off from the filtrate by heating under reduced pressure. This purification procedure gave an alkenyl-terminated polymer. The polymer obtained had a viscosity of 43 Pa·s and a number average molecular weight of 11,300 as determined by GPC analysis (mobile phase: chloroform; expressed in terms of polystyrene equivalent) with a molecular weight distribution of 1.12. The number of alkenyl groups per polymer molecule was 1.82 as determined by
$^1$H-NMR analysis.

EXAMPLE 1

The polymer of Synthesis Example 1 (100 weight parts), 3.9 weight parts of a hydrosilyl-containing compound having an average composition of $(CH_3)_3Si(OSi(CH_3)(CH_2CH(CH_3)C_6H_5))_{1.5}(OSi(CH_3)H)_6OSi(CH_3)_3$ (SiH group:alkenyl group mole ratio=1.5), $5\times10^{-4}$ equivalents (relative to alkenyl group) of platinum(0)-divinyltetramethyldisiloxane complex, 30 equivalents of dimethyl maleate (relative to platinum atom) and 175 weight parts of a 40% toluene solution of a terpene-phenol type tackifier (YS Polystar T115; product of Yasuhara Chemical) (70 weight parts as tackifier) were mixed up to give a pressure sensitive adhesive composition.

One drop of this composition was dropped onto a hot plate heated at 100° C. and stirred by means of a spatula, and the time required for solidification was measured (snap-up time). The snap-up time was 120 seconds.

The composition was applied to a PET film using a 100-■m coater and the coated film was immediately placed in an oven maintained at 100° C. and cure was caused by heating for 15 minutes. The adhesive obtained was allowed to stick to a SUS substrate and test specimens having a predetermined size were cut out therefrom for adhesion testing by 180-degree peeling. The peel adhesion upon 180-degree at a speed of 100 mm/min was 22 N/25 mm.

EXAMPLE 2

The polymer of Synthesis Example 1 (100 weight parts), 3.9 weight parts of a hydrosilyl-containing compound having an average composition of $(CH_3)_3Si(OSi(CH_3)(CH_2CH(CH_3)C_6H_5))_{1.5}(OSi(CH_3)H)_6OSi(CH_3)_3$ (SiH group:alkenyl group mole ratio=1.5), $5\times10^{-4}$ equivalents (relative to alkenyl group) of platinum(0)-divinyltetramethyldisiloxane complex, 30 equivalents of dimethyl maleate (relative to platinum atom) and 175 weight parts of a 40% toluene solution of a rosin ester type tackifier (Super Ester A-100; product of Arakawa Chemical Industries) (70 weight parts as tackifier) were mixed up to give a pressure sensitive adhesive composition.

One drop of this composition was dropped onto a hot plate heated at 100° C. and stirred by means of a spatula, and the time required for solidification was measured (snap-up time). The snap-up time was 28 seconds.

The composition was applied to a PET film using a 100-■m coater and the coated film was immediately placed in an oven maintained at 100° C. and curing was caused by heating for 15 minutes. The adhesive obtained was allowed to stick to a SUS substrate and test specimens having a predetermined size were cut out therefrom for adhesion testing by 180-degree peeling. The peel adhesion upon 180-degree at a speed of 100 mm/min was 15 N/25 mm.

Reference Example 1

The polymer of Synthesis Example 1 (100 weight parts), 3.9 weight parts of a hydrosilyl-containing compound having an average composition of $(CH_3)_3Si(OSi(CH_3)(CH_2CH(CH_3)C_6H_5))_{1.5}(OSi(CH_3)H)_6OSi(CH_3)_3$ (SiH group:alkenyl group mole ratio=1.5) and $10^{-4}$ equivalents (relative to alkenyl group) of platinum(O)-divinyltetramethyldisiloxane complex were mixed up to give a curable composition.

One drop of this composition was dropped onto a hot plate heated at 130° C. and stirred by means of a spatula, and the time required for solidification was measured (snap-up time). The snap-up time was 26 seconds.

The above curable composition was poured into a mold and, after deaeration under reduced pressure, heated at 100° C., to give a cured product. The cured product was immersed in toluene for 24 hours and then dried with heating. The gel fraction determined based on the weight change after immersion was 90%.

INDUSTRIAL APPLICABILITY

The pressure sensitive adhesive composition of the present invention comprises, as the main component, an alkenyl-containing vinyl polymer having a narrow molecular weight distribution and therefore showing a low viscosity, hence can have a high solid content. Since the degree of alkenyl group introduction is high, the composition can give cured products having a high gel fraction and can be cured rapidly. It has sufficient physical characteristics for use as a pressure sensitive adhesive or the like.

What is claimed is:

1. A pressure sensitive adhesive composition which comprises the following two components:

(A) a vinyl polymer having at least one alkenyl group represented by the general formula (1):

$$CH_2=C(R^1)— \qquad (1)$$

wherein $R^1$ represents a hydrogen atom or a methyl group; and (B) a hydrosilyl group-containing compound, wherein the (A) component vinyl polymer has a molecular weight distribution of less than 1.8.

2. The pressure sensitive adhesive composition according to claim 1, wherein the (A) component vinyl polymer is a (meth) acrylic polymer.

3. The pressure sensitive adhesive composition according to claim 1, wherein a production method of the component (A) vinyl polymer comprises living radical polymerization.

4. The pressure sensitive adhesive composition according to claim 1, wherein a production method of the component (A) vinyl polymer comprises atom transfer radical polymerization.

5. The pressure sensitive adhesive composition according to claim 1, wherein the component (A) vinyl polymer has at least one alkenyl group represented by the general formula (1) at its molecular chain terminus.

6. The pressure sensitive adhesive composition according to claim 1, wherein the component (A) vinyl polymer is obtainable by the steps of:

(1) polymerizing a vinyl monomer in the manner of atom transfer radical polymerization to thereby produce a vinyl polymer having a terminal structure represented by the general formula (2):

$$—C(R^2)(R^3)(X) \qquad (2)$$

wherein $R^2$ and $R^3$ each represents a group bound to the ethylenically unsaturated group of said vinyl monomer and X represents a chlorine, bromine or iodine atom, and (2) converting the terminal halogen atom of said polymer to a substituent having the alkenyl group of the general formula (1).

7. The pressure sensitive adhesive composition according to claim 1, wherein the component (A) vinyl polymer is obtainable by the steps of:

(1) polymerizing a vinyl monomer in the manner of living radical polymerization for producing a vinyl polymer and (2) successively reacting said polymer with a compound having at least two alkenyl groups having low polymerizability.

8. The pressure sensitive adhesive composition according to claim 2, wherein a production method of the component (A) vinyl polymer comprises living radical polymerization.

9. The pressure sensitive adhesive composition according to claim 2, wherein a production method of the component (A) vinyl polymer comprises atom transfer radical polymerization.

10. The pressure sensitive adhesive composition according to claim 3, wherein a production method of the component (A) vinyl polymer comprises atom transfer radical polymerization.

11. The pressure sensitive adhesive composition according to claim 2, wherein the component (A) vinyl polymer has at least one alkenyl group represented by the general formula (1) at its molecular chain terminus.

12. The pressure sensitive adhesive composition according to claim 3, wherein the component (A) vinyl polymer has at least one alkenyl group represented by the general formula (1) at its molecular chain terminus.

13. The pressure sensitive adhesive composition according to claim 4, wherein the component (A) vinyl polymer has at least one alkenyl group represented by the general formula (1) at its molecular chain terminus.

14. The pressure sensitive adhesive composition according to claim 2,
wherein the component (A) vinyl polymer is obtainable by the steps of:

(1) polymerizing a vinyl monomer in the manner of atom transfer radical polymerization to thereby produce a vinyl polymer having a terminal structure represented by the general formula (2):

$$—C(R^2)(R^3)(X) \qquad (2)$$

wherein $R^2$ and $R^3$ each represents a group bound to the ethylenically unsaturated group of said vinyl monomer and X represents a chlorine, bromine or iodine atom, and (2) converting the terminal halogen atom of said polymer to a substituent having the alkenyl group of the general formula (1).

* * * * *